Feb. 20, 1940.  R. M. SNYDER  2,191,327
CART
Filed May 17, 1939   2 Sheets-Sheet 1
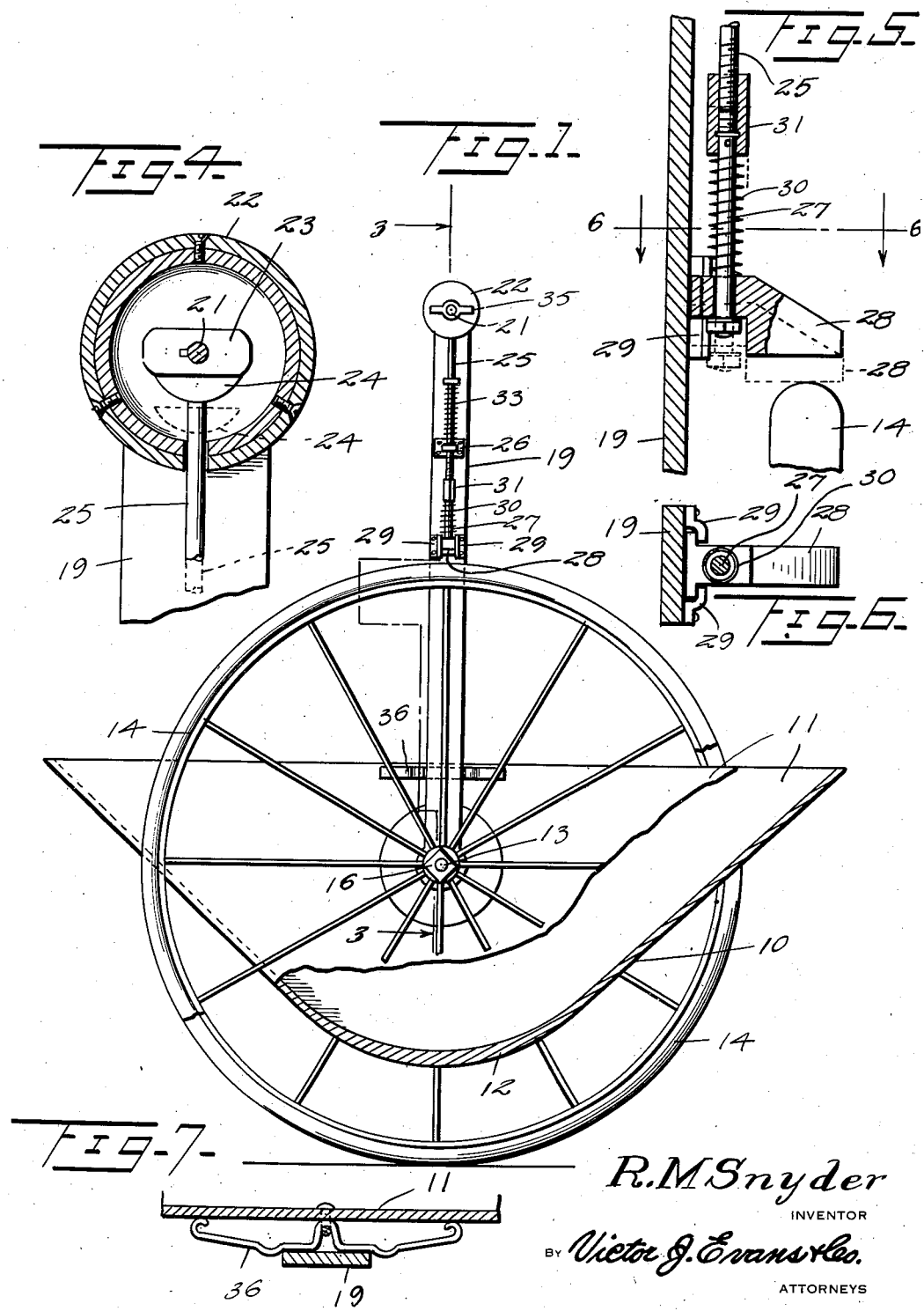
R. M. Snyder
INVENTOR
BY Victor J. Evans & Co.
ATTORNEYS

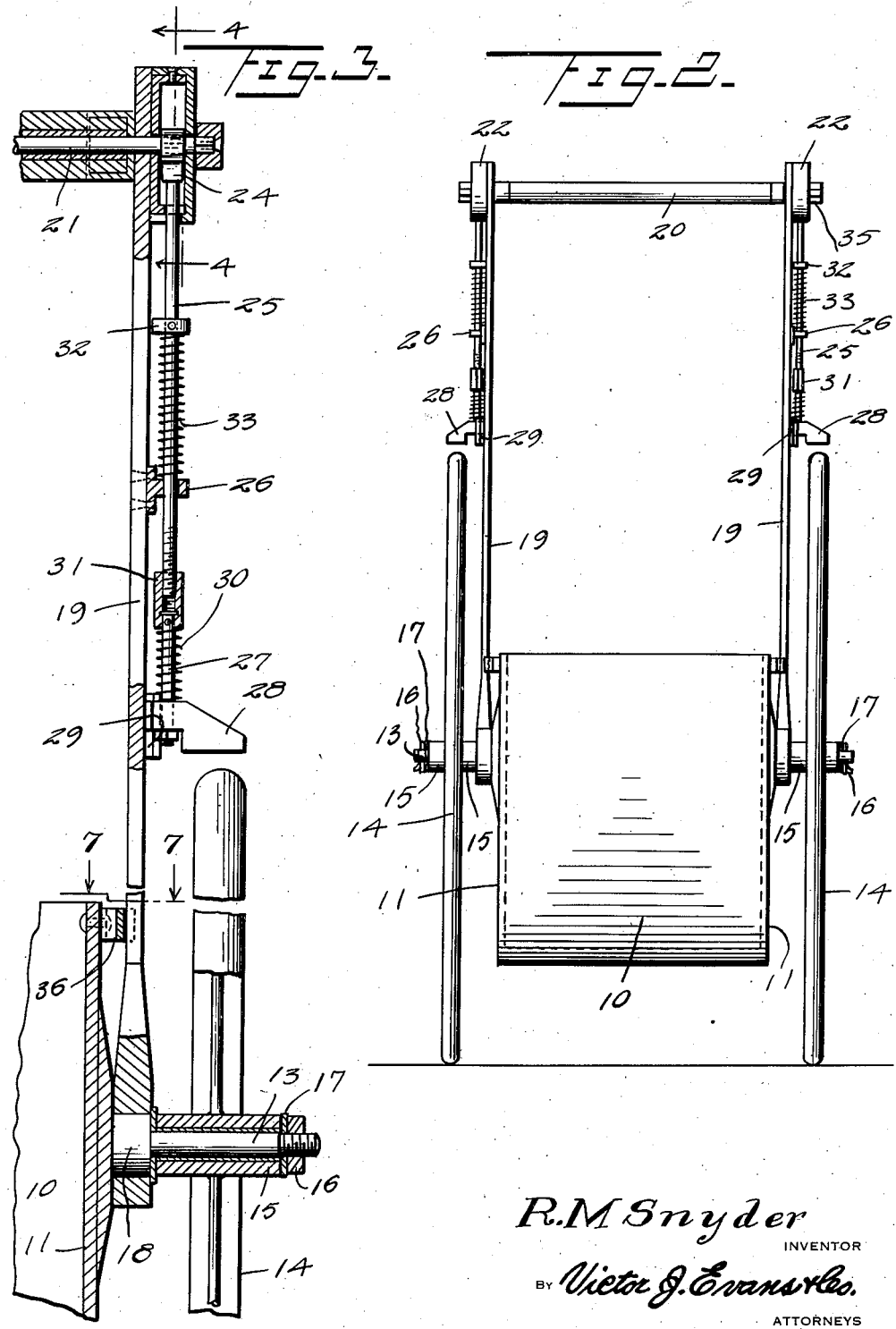

Patented Feb. 20, 1940

2,191,327

UNITED STATES PATENT OFFICE 2,191,327

CART

Raymond M. Snyder, Pittsburgh, Pa., assignor of thirty per cent to Gilbert F. Wagner, Pittsburgh, Pa.

Application May 17, 1939, Serial No. 274,256

3 Claims. (Cl. 298—2)

The invention relates to a cart and more especially to a dumping cart.

The primary object of the invention is the provision of a cart of this character wherein its body is in the form of a hopper or what might be termed a bucket and is supported upon wheels so that the cart in its entirety can be moved from one locality to another and in the use thereof a load can be conveniently dumped, the dumping being had from either side thereby eliminating the necessity of turning the cart for dumping purposes as is customary with that type of vehicles susceptible of dumping only at one side.

Another object of the invention is the provision of a cart of this character wherein the wheels are controlled by brakes, these being hand operated and such cart can be pushed or pulled at the election of the user thereof, the brakes being useable where the cart is descending a grade and it is required to stop the same thereon.

A further object of the invention is the provision of a cart of this character wherein a material can be conveniently and neatly hauled and the load can be wheeled up or down steps in a convenient manner without liability of upsetting the load when so doing.

A still further object of the invention is the provision of a cart of this character which is simple in its construction, thoroughly reliable and efficient in operation, the body thereof being susceptible of being turned upside down which enables convenient dumping action thereof, strong, durable and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention and pointed out in the claims hereunto appended.

In the accompanying drawings:

Figure 1 is a side elevation partly in section of a cart constructed in accordance with the invention.

Figure 2 is a front or rear elevation thereof.

Figure 3 is a fragmentary sectional view taken on the line 3—3 of Figure 1 looking in the direction of the arrows.

Figure 4 is a fragmentary sectional view of the device taken on the line 4—4 of Figure 3 looking in the direction of the arrows.

Figure 5 is a view similar to Figure 3 showing by full lines a brake in one position and by dotted lines in an adjusted position.

Figure 6 is a sectional view taken on the line 6—6 of Figure 5 looking in the direction of the arrows.

Figure 7 is a fragmentary sectional view taken on the line 7—7 of Figure 3 looking in the direction of the arrows.

Similar reference characters indicate corresponding parts throughout the several views in the drawings.

Referring to the drawings in detail, the cart comprises a hopper shaped or bucket-like body 10 having opposite straight vertical sides 11, the lowermost portion of this body being weighted as shown at 12 for balancing purposes and protruding outwardly from opposite sides 11 of the body are stud axles 13, these being located at the vertical center of said body and below the open top thereof. Journaled on the stud axles 13 are rubber tired traction wheels 14, the hubs 15 being loosely held upon said axles 13 in any suitable manner preferably by fasteners 16 in association with washers 17. The axles 13 next to the sides 11 of the body 10 are formed with circular enlargements 18 to which are loosely fitted the side arms 19 of a handle including a cross gripping rung 20 loose upon a turnable mounting shaft 21 which is extended crosswise between the arms 19 being loosely passed therethrough and into circular casings 22, these being fixed at the outer sides of the arms 19. Within each casing 22 operates a turnable cam 23 being splined or keyed to the shaft 21 for operation thereby. Each cam 23 operates upon a contact 24 for said cam and at the upper end of a plunger 25 being sectional in kind and slides through a guide 26 fixed at the outer side of the arm 19 adjacent thereto. This plunger 25 at the lower section 27 thereof carries a brake shoe 28 which is displaceably mounted upon the section 27 and slidably engages a guide 29 fixed at the outer side of the arm 19 next thereto. The brake shoe 28 is adapted for contact with the wheel 14 adjacent thereto and is sustained under tension by a coil compression spring 30 fitting the section 27 and engaging a coupling 31 joining the section 27 with the remainder of the plunger 25 so that the shoe 28 will yield slightly when making contact with the wheel 14 common thereto yet be sustained under tension for braking action upon the latter on the application of the brakes built with the cart.

There is a pair of brake shoes 28 each operating with the companion thereto of the wheels of the cart. Surrounding the plunger 25 and having contact with the guide 26 and an adjustable collar 32 on said plunger is a coiled lift spring 33 which lifts the said plunger and maintains the contact 24 thereof at all times engageable with the cam 23. In one position of the cam 23 the brakes are applied and in another position released.

Outside of the casings 22 and fitted to opposite ends of the shaft 21 are turn keys or buttons 35 which enable the manual setting of the brakes and the releasing thereof, the shaft 21 being turnable for this purpose.

The handle before described enables the cart to be pushed or pulled by hand or otherwise.

Fitted at the outer faces of the vertical sides 11 of the body 10 are depressible spring latches 36 one on each side of the body and engaged by these latches are the side arms 19 of the handle so as to lock the said handle in a perpendicular or vertical position. The latches 36 are located at the vertical center of the body 10 and in Figure 1 of the drawings the handle is in a latched upright or perpendicular position. In this position the cart can be lifted by hand either with or without a load in the body thereof. The wheels 14 render the cart mobile so that it can be rolled or wheeled from one locality to another. The body 10 of the cart resembles a scoop and the same is balanced in a load carrying position due to the weighted lowermost end 12 thereof being susceptible of being turned upside down when the occasion requires and such body can be dumped at either side of its axis constituted by the stud axles 13 having the hubs 15 of the wheels 14 journaled thereon.

Normally the brake shoes 28 are elevated away from the wheels 14 and these brake shoes 28 can be moved to braking position with relation to the wheels by operating the key or knob 35 at either or both sides of the handle.

The handle is swingable from the perpendicular position reversely in an arcuate course and has the axles 13 at the portions 18 thereof constituting the axis of said handle.

What is claimed is:

1. A cart of the kind described comprising a hopper shaped body, stud axles at opposite sides of the body, traction wheels fitting said axles, a handle swingable on said axles, brake means fitting said handle and engageable with the wheels, and means associated with the handle for manual control of said brake means.

2. A cart of the kind described comprising a hopper shaped body, stud axles at opposite sides of the body, traction wheels fitting said axles, a handle swingable on said axles, brake means fitting said handle and engageable with the wheels, means associated with the handle for manual control of said brake means, and weight means at the lowermost portion of the body for balancing the same vertically.

3. A cart of the kind described comprising a hopper shaped body, stud axles at opposite sides of the body, traction wheels fitting said axles, a handle swingable on said axles, brake means fitting said handle and engageable with the wheels, means associated with the handle for manual control of said brake means, weight means at the lowermost portion of the body for balancing the same vertically, and latch means arranged on the body and engageable with the handle to hold the same in a substantially perpendicular position when the body is vertically balanced.

RAYMOND M. SNYDER.